(12) United States Patent
Ogami

(10) Patent No.: US 8,387,479 B2
(45) Date of Patent: Mar. 5, 2013

(54) DUAL CLUTCH TRANSMISSION CONTROL DEVICE

(75) Inventor: Shiro Ogami, Kariya (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 661 days.

(21) Appl. No.: 12/535,037

(22) Filed: Aug. 4, 2009

(65) Prior Publication Data

US 2010/0024581 A1  Feb. 4, 2010

(30) Foreign Application Priority Data

Aug. 4, 2008  (JP) ................................. 2008-201095

(51) Int. Cl.
*F16H 59/00* (2006.01)
*F16H 61/00* (2006.01)
*F16H 63/00* (2006.01)
*B60W 10/00* (2006.01)

(52) U.S. Cl. ........................................ 74/336 R; 477/77

(58) Field of Classification Search .................... 74/330, 74/331, 335, 340, 336 R; 477/115, 116, 477/120, 904, 77; 701/57, 64

See application file for complete search history.

(56) References Cited

U.S. PATENT DOCUMENTS

| | | | | |
|---|---|---|---|---|
| 5,711,409 A | * | 1/1998 | Murata | 192/48.611 |
| 6,286,381 B1 | * | 9/2001 | Reed et al. | 74/336 R |
| 6,490,944 B1 | * | 12/2002 | Heinzel et al. | 74/335 |
| 6,679,134 B2 | * | 1/2004 | Shigyo | 74/336 R |
| 6,684,143 B2 | * | 1/2004 | Graf et al. | 701/51 |
| 6,790,159 B1 | * | 9/2004 | Buchanan et al. | 477/86 |
| 6,949,051 B2 | * | 9/2005 | Katakura | 477/175 |
| 6,978,691 B2 | * | 12/2005 | Katakura | 74/331 |
| 7,171,867 B2 | * | 2/2007 | McCrary et al. | 74/331 |

(Continued)

FOREIGN PATENT DOCUMENTS

| | | |
|---|---|---|
| EP | 1 826 464 A2 | 8/2007 |
| EP | 1 850 038 A2 | 10/2007 |

(Continued)

OTHER PUBLICATIONS

Extended European Search Report issued on Oct. 21, 2009 by the European Patent Office in European Patent Application No. 09009865.8.

(Continued)

*Primary Examiner* — Troy Chambers
*Assistant Examiner* — Michael Gonzalez
(74) *Attorney, Agent, or Firm* — Buchanan Ingersoll & Rooney PC

(57) ABSTRACT

A dual clutch transmission includes a first and second input shaft, an output shaft, a dual clutch having a first clutch and a second clutch, a first and second gear transmission mechanisms, and a control device connected to an accelerator opening degree sensor, detecting an accelerator opening degree, and a rotational speed sensor, detecting a rotational speed of an engine, and is provided with a pre-shift control device pre-selecting the shift stage gear set for establishing the shift stage, which is one stage upper or lower than the shift stage established by the selected shift stage gear set from one of the first and second gear transmission mechanisms, when values of the accelerator opening degree, the rotational speed, and the rotation acceleration, becomes equal to or more than predetermined upper shift stage pre-shift setting values or equal to or less than predetermined lower shift stage pre-shift setting values.

2 Claims, 4 Drawing Sheets

U.S. PATENT DOCUMENTS

| | | | |
|---|---|---|---|
| 7,314,427 B2 * | 1/2008 | Sakai et al. | 477/116 |
| 7,384,374 B2 * | 6/2008 | Jiang | 477/120 |
| 7,429,233 B2 * | 9/2008 | Bothe et al. | 477/115 |
| 7,455,619 B2 * | 11/2008 | Jiang | 477/176 |
| 7,591,203 B2 * | 9/2009 | Ochi et al. | 74/331 |
| 7,621,844 B2 * | 11/2009 | Kishi | 477/120 |
| 7,740,558 B2 * | 6/2010 | Matsumura et al. | 477/79 |
| 7,862,474 B2 * | 1/2011 | Kimura et al. | 477/125 |
| 7,976,432 B2 * | 7/2011 | Tanaka | 477/125 |
| 2003/0178278 A1 | 9/2003 | Shigyo | |
| 2004/0182187 A1 | 9/2004 | Katakura | |
| 2007/0199395 A1 | 8/2007 | Ochi et al. | |
| 2007/0254775 A1 | 11/2007 | Kishi | |
| 2008/0312036 A1 * | 12/2008 | Yagi et al. | 477/115 |

FOREIGN PATENT DOCUMENTS

| | | |
|---|---|---|
| JP | 2003-269592 A | 9/2003 |
| JP | 2004-286071 A | 10/2004 |
| JP | 2007-232047 A | 9/2007 |
| JP | 2007-292250 A | 11/2007 |

OTHER PUBLICATIONS

Japanese Official Action issued Jun. 7, 2012 by the Japanese Patent Office in Japanese Patent Application No. 2008-201095, and partial English translation of the Official Action.

* cited by examiner

DUAL CLUTCH TRANSMISSION CONTROL DEVICE

CROSS REFERENCE TO RELATED APPLICATIONS

This application is based on and claims priority under 35 U.S.C. §119 to Japanese Patent Application 2008-201095, filed on Aug. 4, 2008, the entire contents of which is incorporated herein by reference.

FIELD OF THE INVENTION

The present invention relates to a dual clutch transmission, in which a shift operation is manually performed by a driver.

BACKGROUND

A dual clutch type transmission (a twin clutch type transmission) having two clutches is disclosed in JP2007-232047A, for example. In the dual clutch type transmission, rotation of an output shaft of an engine is transmitted to one of first and second input shafts of a transmission by means of one of first and second clutches of a dual clutch, and then rotational speed of the first and second input shafts is changed by means of each shift stage gear set, arranged between each of the first and second input shafts and an output shaft of the transmission, before the rotation is transmitted to the output shaft. The dual clutch type transmission includes a function for switching between an automatic speed change mode and a manual speed change mode. In the automatic speed change mode, an upshift/downshift command is automatically outputted by executing a program stored in a microcomputer in order to establish an appropriate shift stage. In the manual speed change mode, a shift command is outputted in response to a manual operation of a driver in order to establish a desired shift stage.

In the automatic speed change mode of the dual clutch transmission according to JP2007-232047A, a next shift stage is determined on the basis of an operation amount of an accelerator, detected by means of an accelerator position sensor, and a vehicle speed, detected by an output shaft sensor, and then one of the shift stage gear sets between an input shaft, which is not transmitting rotational torque, and an output shaft is selected to be in a standby state of the determined next shift stage (a pre-shift control). Consequently, a shift operation during the automatic speed change mode is executed quickly. Further, in the manual speed change mode, external information, such as a radius of curvature of a road, is obtained from a navigation control apparatus, so that a next shift stage is determined on the basis of the obtained external information and the vehicle speed, detected by the output shaft sensor, and thereby the pre-shift control is executed in the same manner as the automatic speed change mode.

According to the dual clutch type transmission disclosed in JP2007-232047A, in the automatic speed change mode, the pre-shift control of a next shift stage is executed by means of the microcomputer which controls shifting to the next shift stage. Therefore, the pre-shift control is surely executed before the shift stages are shifted. In the manual speed change mode, however, the pre-shift control is executed on the basis of the external information of roads and the like, obtained from the navigation control apparatus. Therefore, whether the driver has the intention of accelerating the vehicle speed or decelerating the vehicle speed may not be determined only on the basis of the external information. Accordingly, when the shift command is outputted in response to an operation of the driver, the shift stages may be shifted subsequently so as to form a corresponding shift stage, and then, the dual clutch may be shifted in order to complete the shift operation. As a result, the driver may feel uncomfortable because a time required for shifting to the desired shift stages is increased.

A need thus exists for a dual clutch transmission, which is not susceptible to the drawback mentioned above.

SUMMARY OF THE INVENTION

According to an aspect of the present invention, a dual clutch transmission includes a first input shaft, a second input shaft coaxially arranged with the first input shaft, an output shaft arranged in parallel with the first input shaft and the second input shaft, a dual clutch having a first clutch and a second clutch transmitting rotational torque of an engine to the first input shaft and the second input shaft, respectively, a first gear transmission mechanism arranged between the first input shaft and the output shaft, having a plurality of shift stage gear sets for establishing odd-numbered shift stages, selecting one of the plurality of shift stage gear sets for establishing the odd-numbered shift stages, and transmitting rotational torque of the first input shaft to the output shaft, a second gear transmission mechanism arranged between the second input shaft and the output shaft, having a plurality of shift stage gear sets for establishing even-numbered shift stages, selecting one of the plurality of shift stage gear sets for establishing the even-numbered shift stages, and transmitting rotational torque of the second input shaft to the output shaft, and a control device selecting one of the shift stage gear sets from either the first gear transmission mechanism or the second gear transmission mechanism, changing the first clutch and the second clutch of the dual clutch on the basis of a command of shifting the shift stages, outputted in response to a manual operation, and transmitting the rotational torque of the engine to the output shaft by means of the selected shift stage gear set.

The control device is connected to at least one of an accelerator opening degree sensor, detecting an accelerator opening degree, and a rotational speed sensor, detecting a rotational speed of the engine, and is provided with a pre-shift control device pre-selecting one of the shift stage gear sets for establishing the shift stage, which is one stage upper or one stage lower than the shift stage established by the selected shift stage gear set, from one of the first and second gear transmission mechanisms, in which the selected shift stage is not provided, when at least one of values of the accelerator opening degree, detected by means of the accelerator opening degree sensor, the rotational speed, detected by means of the rotational speed sensor, and the rotation acceleration, calculated on the basis of the rotational speed detected by the rotational speed sensor, becomes equal to or more than predetermined upper shift stage pre-shift setting values or equal to or less than predetermined lower shift stage pre-shift setting values.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
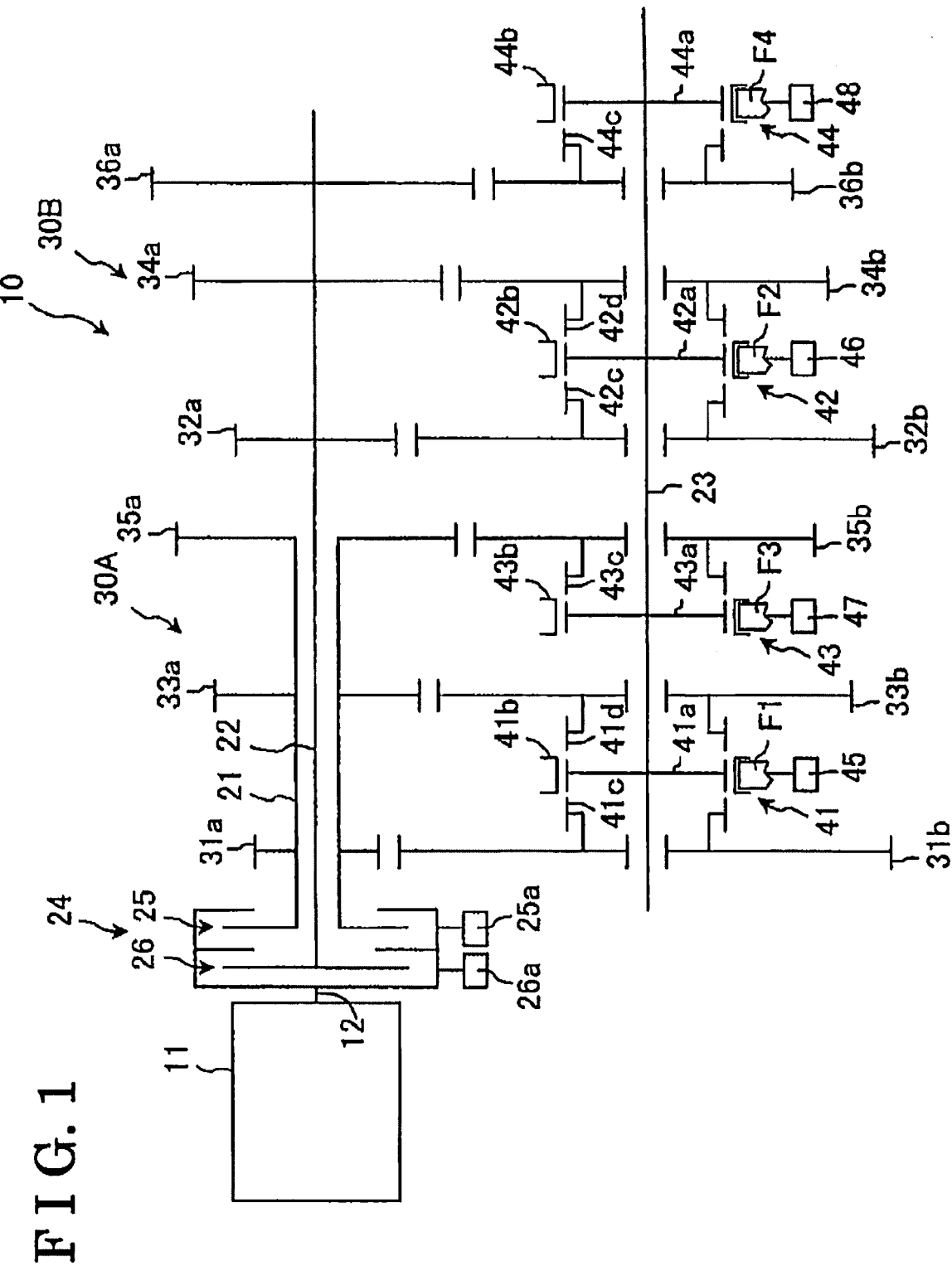
FIG. 1 is a diagram schematically illustrating a configuration of a dual clutch transmission according to an embodiment.

An embodiment of a dual clutch transmission 10 will be provided hereinafter with reference to FIGS. 1 to 3B. An "axial direction" used hereinafter corresponds to an axial direction of each of a first input shaft 21, a second input shaft 22, a first output shaft 23 and a second output shaft 12. As illustrated in FIG. 1, the dual clutch transmission 10 includes six forward movement shift stages and one reverse movement shift stage. The dual clutch transmission 10 includes the cylinder-shaped first input shaft 21, the second input shaft 22, coaxially inserted into the cylinder-shaped first input shaft 21, and the first output shaft 23, arranged in parallel with the first and second input shafts 21 and 22. The first and second input shafts 21 and 22 are rotatably driven in a manner where the first and second input shafts 21 and 22 are respectively connected to a first clutch 25 and a second clutch 26, which are provided at an inside of a housing of a dual clutch 24, rotated by means of the second output shaft 12 of an engine 11. The first and second clutches 25 and 26 are engaged/disengaged by actuating a first clutch actuator 25a and a second clutch actuator 26a, respectively.

A first gear transmission mechanism 30A is provided between the first input shaft 21 and the first output shaft 23, and a second gear transmission mechanism 30B is provided between the second input shaft 22 and the first output shaft 23.

The first gear transmission mechanism 30A includes gear sets for establishing odd-numbered shift stages (i.e., a first shift stage gear set 31a and 31b, a third shift stage gear set 33a and 33b and a fifth shift stage gear set 35a and 35b). First, third and fifth driving gears 31a, 33a and 35a of the first, third and fifth shift stage gear sets (31a and 31b, 33a and 33b, and 35a and 35b) are integrally fixed at the first input shaft 21, while first, third and fifth driven gears 31b, 33b and 35b of the first, third and fifth shift stage gear sets (31a and 31b, 33a and 33b, and 35a and 35b) are rotatably provided at the first output shaft 23. A first shift clutch 41, which selectively connects the first driven gear 31b of the first shift stage gear set 31a and 31b or the third driven gear 33b of the third shift stage gear set 33a and 33b to the first output shaft 23, is provided between the first driven gear 31b and the third driven gear 33b. A third shift clutch 43, which selectively connects the fifth driven gear 35b of the fifth shift stage gear set 35a and 35b to the first output shaft 23, is provided at one side of the fifth driven gear 35b in the axial direction.

While the first gear transmission mechanism 30A includes the gear sets for establishing odd-numbered shift stages, the second gear transmission mechanism 30B includes gear sets for establishing even-numbered shift stages (i.e., a second shift stage gear set 32a and 32b, a fourth shift stage gear set 34a and 34b and a sixth shift stage gear set 36a and 36b). Second, fourth and sixth driving gears 32a, 34a and 36a of the second, fourth and sixth shift stage gear sets (32a and 32b, 34a and 34b and 36a and 36b) are integrally fixed at the second input shaft 22, while second, fourth and sixth driven gears 32b, 34b and 36b of the second, fourth and sixth shift stage gear sets (32a and 32b, 34a and 34b and 36a and 36b) are rotatably provided at the first output shaft 23. A second shift clutch 42, which selectively connects the second driven gear 32b of the second shift stage gear set 32a and 32b or the fourth driven gear 34b of the fourth shift stage gear set 34a and 34b to the first output shaft 23, is provided between the second driven gear 32b and the fourth driven gear 34b. A fourth shift clutch 44, which selectively connects the sixth driven gear 36b of the sixth shift stage gear set 36a and 36b to the first output shaft 23, is provided at one side of the sixth driven gear 36b in the axial direction.

The first to fourth shift clutches 41 to 44, respectively configured by known synchromesh mechanisms, include a first clutch hub 41a, a second clutch hub 42a, a third clutch hub 43a and a forth clutch hub 44a, respectively, and a first sleeve 41b, a second sleeve 42b, a third sleeve 43b and a fourth sleeve 44b, respectively. The first to fourth clutch hubs 41a to 44a are integrally fixed at the first output shaft 23. The first to fourth sleeves 41b to 44b are spline-engaged with outer circumferential surfaces of the corresponding first to fourth clutch hubs 41a to 44a. Each of the first to fourth sleeves 41b to 44b reciprocately moves in the axial direction by means of a first shift fork F1, a second shift fork F2, a third shift fork F3 and a fourth shift fork F4, so as to selectively engage with one of a first engagement member 41c, a third engagement member 41d, a second engagement member 42c, a forth engagement member 42d, a fifth engagement member 43c and a sixth engagement member 44c, which are fixed at the corresponding first to sixth driven gears 31b to 36b respectively arranged at both sides (or one side) of the first to fourth sleeves 41b to 44b in the axial direction. Consequently, each of the first to sixth driven gears 31b to 36b is selectively connected to the first output shaft 23 via the first to fourth clutch hubs 41a to 44a. The first to forth shift forks F1 to F4 are moved reciprocately in the axial direction by actuating a first shift clutch actuator 45, a second shift clutch actuator 46, a third shift clutch actuator 47 and a fourth shift clutch actuator 48, respectively. Further, synchronizer rings are not shown.

Figure 2:
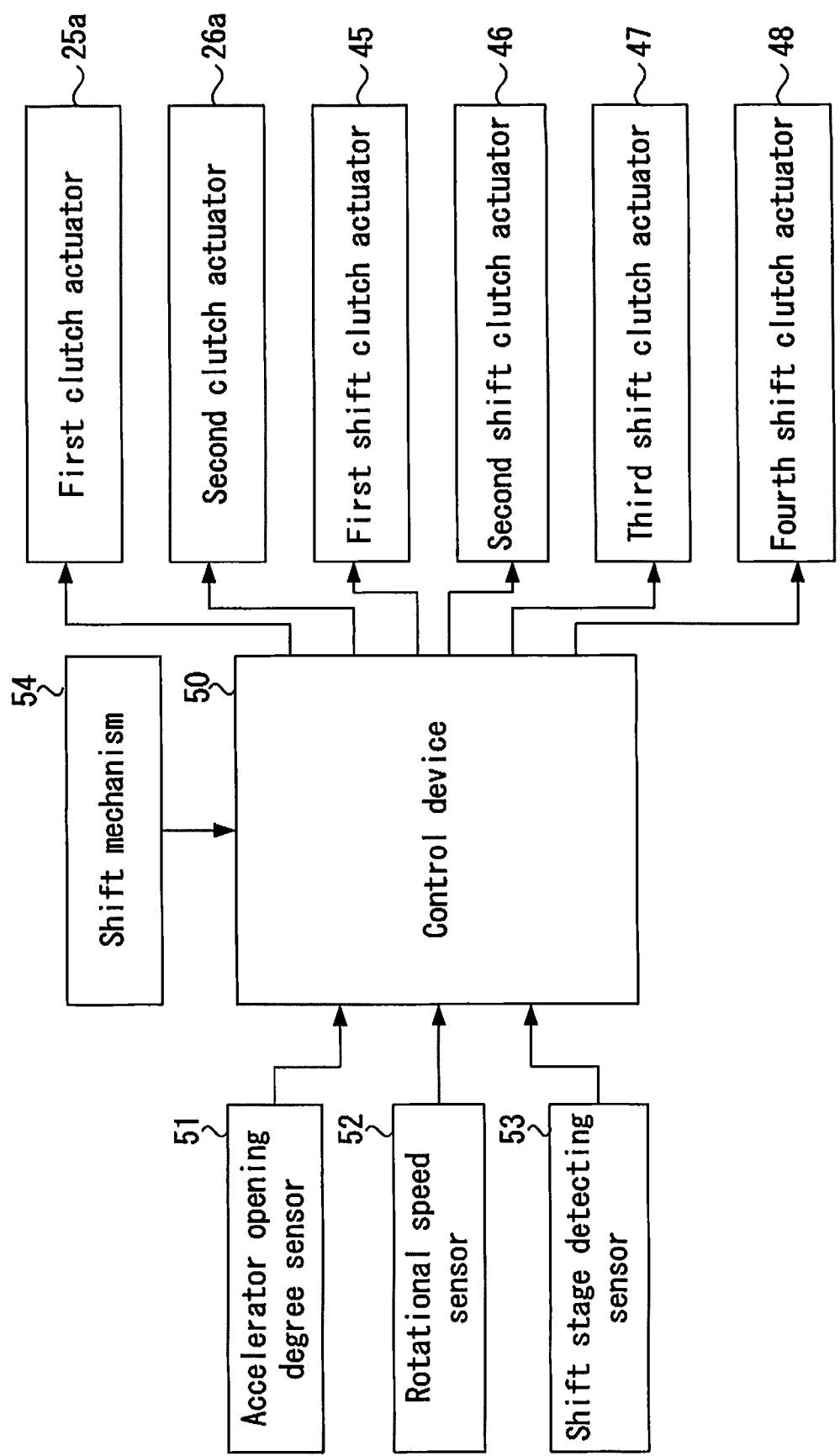
FIG. 2 is a block diagram illustrating a configuration of a control device.

A control device 50 of the dual clutch transmission 10 controls an operation of shifting the shift stages on the basis a command of shifting the shift stages outputted in response to a manual operation by a driver (user). As illustrated in FIG. 2, the control device 50 is connected to an accelerator opening degree sensor 51, a rotational speed sensor 52, a shift stage detecting sensor 53, a shift mechanism 54, the first and second clutch actuators 25a and 26a, and the first to fourth shift clutch actuators 45 to 48. The accelerator opening degree sensor 51 detects an accelerator opening degree O for adjusting output of the engine 11. The rotational speed detecting sensor 52 detects a rotational speed R of the second output shaft 12 of the engine 11. The shift stage detecting sensor 53 detects the shift stage selected from the first to sixth shift stage gear sets 31a and 31b to 36a and 36b. The control device 50 further includes a calculating means for calculating a rotation acceleration A of the engine 11 on the basis of the rotational speed R of the second output shaft 12 of the engine 11, which is detected by the rotational speed sensor 52. The shift mechanism 54 outputs the command of shifting the shift stages to the control device 50 in response to the manual operation of a shift lever. Further, the rotational speed sensor 52 may include a sensor for detecting a rotational speed of a component, connected to the second rotational shaft 12 of the engine 11.

Upper shift stage pre-shift setting values Oa, Ra and Aa, lower shift stage pre-shift setting values Ob, Rb and Ab, upper shift stage pre-shift releasing values Oc, Rc and Ac, lower shift stage pre-shift releasing values Od, Rd and Ad, each of which is predetermined so as to correspond to each of the shift stages, are memorized in a memory of the control device 50.

The control device 50 includes a pre-shift control means (a pre-shift control device). When at least one of values of the accelerator opening degree O, detected by means of the accelerator opening degree sensor 51, the rotational speed R, detected by the rotational speed sensor 52, and the rotation acceleration A of the engine 11, calculated on the basis of the rotational speed R, becomes equal to or more than the upper shift stage pre-shift setting values Oa, Ra and Aa, or equal to or less than the lower shift stage pre-shift setting values Ob, Rb and Ab of the currently-selected shift stage, the pre-shift control means pre-selects one of the first to sixth shift stage gear set 31a and 31b to 36a and 36b for establishing a shift stage, which is one stage upper than the currently-selected shift stage (or, a shift stage which is one stage lower than the currently-selected shift stage) from the gear transmission mechanism in which the currently-selected shift stage gear set 31a and 31b to 36a and 36b is not included. "The shift stage, which is one stage upper than the currently-selected shift stage (the shift stage which is one stage lower than the currently-selected shift stage)" used hereinafter will be referred to as one upper shift stage (one lower shift stage). According to the embodiments, the pre-shift control means is executed on the basis of determinations whether or not all the values of the detected accelerator opening degree O, the detected rotational speed R and the calculated rotation acceleration A are equal to or more than the upper shift stage pre-shift setting values Oa, Ra and Aa, or equal to or less than the lower shift stage pre-shift setting values Ob, Rb and Ab of the currently-selected shift stage.

The control device 50 includes a pre-shift releasing means (a pre-shift releasing device). In a state where one of the shift stage gear set 31a and 31b to 36a and 36b, which is pre-selected by the pre-shift control means, is not transmitting the torque of the engine 11 because corresponding one of the first or second clutches 25 and 26 of the dual clutch 24 is not changed to transmit the torque of the engine, when at least one of the values of the accelerator opening degree O, detected by means of the accelerator opening degree sensor 51, the rotational speed R, detected by the rotational speed sensor 52, and the rotation acceleration A of the engine 11, calculated on the basis of the rotational speed R, becomes equal to or less than the upper shift stage pre-shift releasing values Oc, Rc and Ac, or, equal to or more than the lower shift stage pre-shift releasing values Od, Rd and Ad of the currently-selected shift stage, the pre-shift releasing means cancels the selection the first to sixth shift stage gear set 31a and 31b to 36a and 36b, which is selected for the pre-shift. According to the embodiments, the pre-shift releasing means is actuated on the basis of whether or not all the values of the detected accelerator opening degree O, the detected rotational speed R and the calculated rotation acceleration A are equal to or less than the upper shift stage pre-shift releasing values Oc, Rc and Ac (or, equal to or more than the lower shift stage pre-shift releasing values Od, Rd and Ad) of the currently-selected shift stage.

A pre-shift control and a pre-shift releasing control of the dual clutch transmission 10, described above, will be described in detail hereinafter. When a driver of a vehicle, on which the dual clutch transmission 10 is mounted, starts the engine 11 of the vehicle, the control device 50 repetitively executes a program shown in a flow chart of FIGS. 3A and 3B.

In step 101, the currently-selected shift stage, detected by means of the shift stage detecting sensor 53 (i.e., description, such as "detect the shift stage" or similar expressions hereinafter also refer to the fact that the shift stage detecting sensor 53 detects the state that none of the shift stage is currently established), the accelerator opening degree O, detected by means of the accelerator opening degree sensor 51, the rotational speed R, detected by the rotational speed sensor 52, are inputted into the control device 50. Then, the control device 50 calculates the rotation acceleration A of the engine 11 on the basis of the rotational speed R.

In steps 102 and 103, the control device 50 determines whether or not the driver has an intention to shift the shift stages to the one upper shift stage or the one lower shift stage. In step 102, the control device 50 determines whether or not all the values of the accelerator opening degree O, the rotational speed R and the rotation acceleration A are equal to or more than the upper shift stage pre-shift setting values Oa, Ra and Aa of the currently-selected shift stage, in order to determine whether or not the driver has the intention to shift the shift stages to the one upper shift stage. When all the values of the accelerator opening degree O, the rotational speed R and the rotation acceleration A are equal to or more than the upper shift stage pre-shift setting values Oa, Ra and Aa of the currently-selected shift stage, the control device 50 determines that the driver has the intention to shift the shift stages to the one upper shift stage, and then the process proceeds to step 104.

On the other hand, in step 102, when all the values of the accelerator opening degree O, the rotational speed R and the rotation acceleration A are not equal to or more than the upper shift stage pre-shift setting values Oa, Ra and Aa of the currently-selected shift stage, the control device 50 determines that the driver does not have the intention to shift the shift stages to the one upper shift stage, and then the process proceeds to step 103. In step 103, the control device 50 determines whether or not all the values of the accelerator opening degree O, the rotational speed R and the rotation acceleration A are equal to or less than the lower shift stage pre-shift setting values Ob, Rb and Ab of the currently-selected shift stage, in order to determine whether or not the driver has the intention to shift the shift stages to the one lower shift stage. When all the values of the accelerator opening degree O, the rotational speed R and the rotation acceleration A are equal to or less than the lower shift stage pre-shift setting values Ob, Rb and Ab of the currently-selected shift stage, the control device 50 determines that the driver has the intention to shift the shift stages to the one lower shift stage, and then the process proceeds to step 110. When all the values of the accelerator opening degree O, the rotational speed R and the rotation acceleration A are not equal to or less than the lower shift stage pre-shift setting values Ob, Rb and Ab of the currently-selected shift stage, the control device 50 determines that the driver does not have the intention to shift the shift to the one lower shift stage, while the control device 50 determines that the driver does not have the intention to shift the shift stages to the one upper shift stage in step 102, then the process shown in the flow chart ends.

When all the values of the accelerator opening degree O, the rotational speed R and the rotation acceleration A are equal to or more than the upper shift stage pre-shift setting values Oa, Ra and Aa of the currently-selected shift stage, the control device 50 determines that the driver has the intention to shift the shift stages to the one upper shift stage in step 102. Then, the control device 50 executes a pre-shift control in order to pre-select the shift stage gear set 31a and 31b to 36a and 36b for establishing the one upper shift stage, and the process proceeds to step 105.

In step 105, the control device 50 determines whether or not the command of shifting the shift stages to the one upper shift stage is inputted by the driver, using the shift mechanism 54 in response to the manual operation of the driver. When the command of shifting the shift stages is not inputted by the driver, using the shift mechanism 54, the process proceeds to step 106. In step 106, the accelerator opening degree O and the rotational speed R are inputted into the control device 50 one more time, and then the control device 50 calculates the rotation acceleration A, then the process proceeds to step 107.

In step 107, the control device 50 determines whether or not all the values of the accelerator opening degree O, the rotational speed R and the rotation acceleration A are equal to or less than the upper shift stage pre-shift releasing values Oc, Rc and Ac of the currently-selected shift stage, in order to determine whether or not the driver abandons the intention of shifting the shift stages to the one upper shift stage. When all the values of the accelerator opening degree O, the rotational speed R and the rotation acceleration A are not equal to or less than the upper shift stage pre-shift releasing values Oc, Rc and Ac of the currently-selected shift stage, the control device 50 determines that the driver has the intention to shift the shift stages to the one upper shift stage, and then the process returns to step 105.

During repetitive execution of the process of steps 111 to 113, when the command of shifting the shift stages to the one upper shift stage is outputted from the shift mechanism 54 in response to the manual operation of the driver, the control device 50 determines that step 105 is YES, and then the process proceeds to step 108. In step 108, the control device 50 disengages one of the first and second clutches 25 and 26 of the dual clutch 24 in an engaged state, while the control device 50 engages the other of the first and second clutches 25 and 26 in a disengaged state. Consequently, the rotational torque of the engine 11 is shifted to the one upper shift stage and is transmitted to the first output shaft 23, then the process shown in the flow chart ends.

On the other hand, during the repetitive execution of the process of steps 105 to 107, when the driver abandons the intention of shifting the shift stages to the one upper shift stage in a manner of reducing an opening degree of an accelerator, and the like, so that all the values of the accelerator opening degree O, the rotational speed R and the rotation acceleration A inputted and calculated in step 106 are equal to or less than the upper shift stage pre-shift releasing values Oc, Rc and Ac, the control device 50 determines that step 107 is YES, and then the process proceeds to step 109. In step 109, the control device 50 cancels the selection of the pre-shifted first to sixth shift stage gear set 31*a* and 31*b* to 36*a* and 36*b* for establishing the one upper shift stage, and then the process shown in the flow chart ends.

Relative to the above-described process from step 104, when the control device 50 determines, in step 103, that the driver has the intention to shift the shift stages to the one lower shift stage, the control device 50 executes the pre-shift control in step 110 in order to pre-select the first to sixth shift stage gear set 31*a* and 31*b* to 36*a* and 36*b* for establishing the one lower shift stage, and then the process proceeds to step 111.

In step 111, the control device 50 determines whether or not the command of to shifting the shift stages to the one lower shift stage is outputted from the shift mechanism 54 in response to the manual operation of the driver. When the command of shifting the shift stages is not outputted from the shift mechanism 54, the process proceeds to step 112. In step 112, the accelerator opening degree O and the rotational speed R are inputted into the control device 50 one more time, and then the control device 50 calculates the rotation acceleration A, then the process proceeds to step 113. In step 113, the control device 50 determines whether or not all the values of the accelerator opening degree O, the rotational speed R and the rotation acceleration A are equal to or more than the lower shift stage pre-shift releasing values Od, Rd and Ad of the currently-selected shift stage, in order to determine whether or not the driver abandons the intention of shifting the shift stages to the one lower shift stage. When all the values of the accelerator opening degree O, the rotational speed R and the rotation acceleration A are not equal to or more than the upper shift stage pre-shift releasing values Od, Rd and Ad of the currently-selected shift stage, the control device 50 determines that the driver has the intention to shift the shift stages to the one lower shift stage, and then the process returns to step 111.

During repetitive execution of the process of steps 111 to 113, when the command of shifting the shift stages to the one lower shift stage is outputted from the shift mechanism 54 in response to the manual operation of the driver, the control device 50 determines that step 111 is YES, and then the process proceeds to step 114. In step 114, the control device 50 disengages one of the first and second clutches 25 and 26 of the dual clutch 24 in the engaged state, while the control device 50 engages the other of the first and second clutches 25 and 26 in the disengaged state. Consequently, the rotational torque of the engine 11 is shifted the shift stage, which is one stage lower than the previously-selected shift stage and transmitted to the first output shaft 23, then the process shown in the flow chart ends.

On the other hand, during the repetitive execution of the process of steps 111 to 113, when the driver abandons the intention of shifting the shift stages to the one lower shift stage in a manner of increasing an opening degree of an accelerator, and the like, so that all the values of accelerator opening degree O, the rotational speed R and the rotation acceleration A inputted and calculated in step 112 are equal to or more than the lower shift stage pre-shift releasing values Od, Rd and Ad, the control device 50 determines that step 113 is YES, and then the process proceeds to step 115. In step 115, the control device 50 cancels the selection of the pre-shifted first to sixth shift stage gear set 31*a* and 31*b* to 36*a* and 36*b* for establishing, which is one stage lower than the currently-selected shift stage, and then the process shown in the flow chart ends.

Figure 3A:
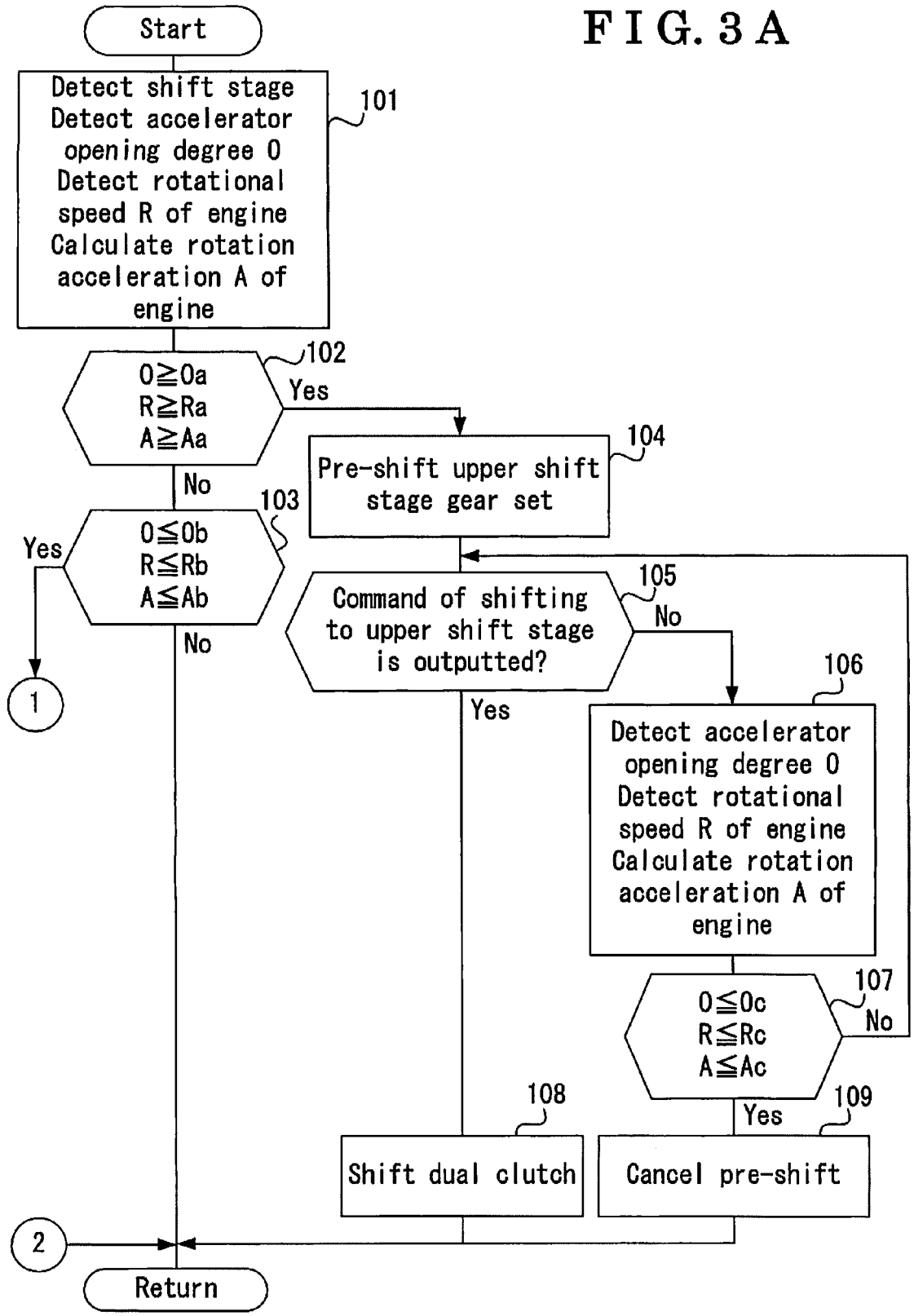
FIG. 3A is a flow chart illustrating a program executed by the control device.
Figure 3B:
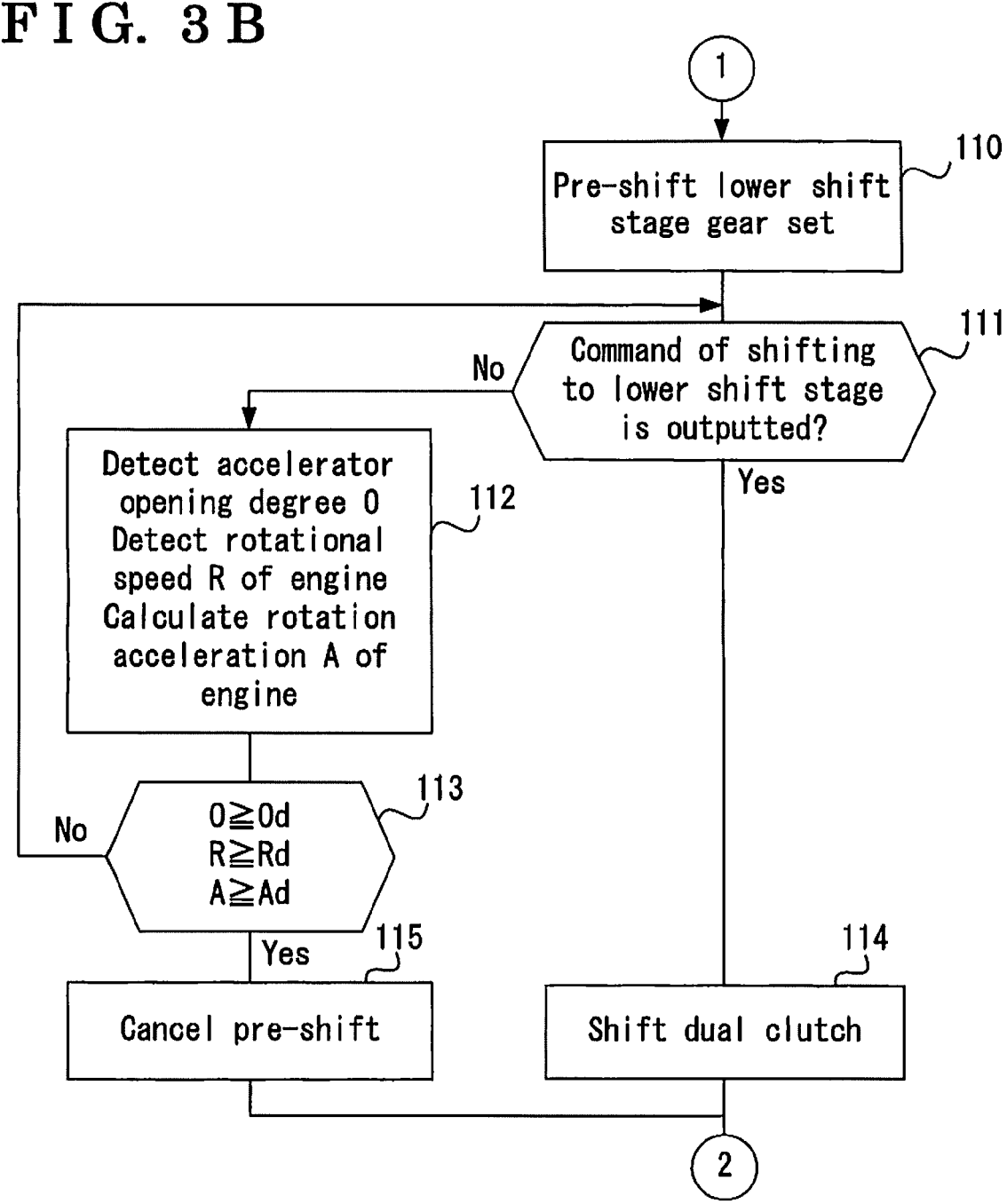
FIG. 3B is a flow chart illustrating the program executed by the control device

An operation of the dual clutch transmission 10 will be described hereinafter with respect to the above-described pre-shift control and pre-shift releasing control. When the dual clutch transmission 10 is in an inoperative state, both of the first and second clutches 25 and 26 of the dual clutch 24 are disengaged, and each of the first to fourth shift clutches 41 to 44 is in a neutral state shown in FIG. 1. When the driver starts the engine 11 of the vehicle, the program shown by the flow chart of FIGS. 3A and 3B is repetitively executed in the dual clutch transmission 10. When the vehicle is in a stopped state, all the values of the accelerator opening degree O, the rotational speed R of the engine 11, and the rotation acceleration A, inputted and calculated in step 101, are neither equal to or more than the upper shift stage pre-shift setting values Oa, Ra and Aa, nor equal to or less than the lower shift stage pre-shift setting values Ob, Rb and Ab. Therefore, the control device 50 determines that both steps 102 and 103 are NO. Accordingly, the pre-shift control is not executed and the process of steps 101 to 103 is repetitively executed.

When the driver operates the shift lever of the shift mechanism 54 in an upshift direction toward the first shift stage, the control device 50 actuates the first shift clutch actuator 45 in order to move the first sleeve 41*b* of the first shift clutch 41 in a left direction in FIG. 1, and consequently, the first shift stage is established by means of the first shift stage gear set 31*a* and 31*b* of the first gear transmission mechanism 30A. Further, the control device 50 actuates the first clutch actuator 25*a* in order to engage the first clutch 25 of the dual clutch 24. Accordingly, the rotational torque of the engine 11 is transmitted to the first output shaft 23 via the first clutch 25, the first input shaft 21, the first shift clutch 41, and the first shift stage gear set 31*a* and 31*b*.

In a state where the first shift stage is established in the dual clutch transmission 10, during the repetitive execution of the process of steps 101 to 103, when the driver accelerates the vehicle, so that all the values of the accelerator opening degree O, the rotational speed R and the rotation acceleration A are equal to or more than the upper shift stage pre-shift setting values Oa, Ra and Aa of the first shift stage, the control device 50 determines that step 102 is YES, and then the process proceeds to step 104. In step 104, the control device 50 actuates the second shift clutch actuator 46 in order to move the second sleeve 42b of the second shift clutch 42 in the left direction in FIG. 1. Consequently, the control device 50 executes the pre-shift control in a manner where the second shift stage gear set 32a and 32b of the second gear transmission mechanism 30B for establishing the shift stage, which is one stage upper than the first shift stage is selected from the second gear transmission mechanism 30B, in which the currently-selected first shift stage gear set 31a and 31b is not provided, and then the process proceeds to steps 105 to 107.

During repetitive execution of the process of steps 105 to 107, when the command of shifting the shift stages to the one lower shift stage is outputted from the shift mechanism 54 in response to the manual operation of the driver, the control device 50 actuates the first and second clutch actuator 25a and 26a in step 108 in order to disengage the first clutch 25 of the dual clutch 24 while engaging the second clutch 26 of the dual clutch 24. Consequently, the rotational torque of the engine 11 is transmitted to the first output shaft 23 via the second clutch 26, the second input shaft 22, the second shift clutch 42 and the second shift stage gear set 32a and 32b. Thus, the shift stage, which reflects the intention of the driver for shifting the shifts stage, is pre-shifted before the command of shifting the shift stages is outputted from the shift mechanism 54 in response to the manual operation of the driver. Therefore, only the dual clutch 24 is required to be operated when the shift stages are shifted. Accordingly, time required to shift the shift stages may be reduced, and the driver may not feel uncomfortable in the shift operation.

On the other hand, during the repetitive execution of the process from steps 105 to 107, when the command of shifting the shift stages to the second shift stage is not outputted in response to the manual operation of the driver in a manner where the driver decelerates the vehicle and the like, so that all the values of the accelerator opening degree O, the rotational speed R and the rotation acceleration A are equal to or less than the upper shift stage pre-shift releasing values Oc, Rc and Ac of the second shift stage, the control device 50 determines that step 107 is YES, and then the process proceeds to the step 109. In step 109, the control device 50 actuates the second clutch actuator 46 so as to move the second sleeve 42b of the second shift clutch 42 in the neutral position. Accordingly, the selection of the second shift stage gear set 32a and 32b, which is pre-shifted, is canceled, and then the process shown in the flow chart ends while executing again the program starting from step 101. When the dual clutch transmission 10 is in the first shift stage, the process of steps 110 to 115 is not executed because there is no lower shift stage than the first stage.

In a state where the second shift stage is established in the dual clutch transmission 10, during the repetitive execution of the process of steps 101 to 103, when the driver accelerates the vehicle, so that all the values of the accelerator opening degree O, the rotational speed R and the rotation acceleration A are equal to or more than the upper shift stage pre-shift setting values Oa, Ra and Aa of the second shift stage, the control device 50 determines that step 102 is YES, and then the process proceeds to step 104. In step 104, the control device 50 actuates the first shift clutch actuator 45 in order to move the first sleeve 41b of the first shift clutch 41 in the right direction in FIG. 1. Consequently, the control device 50 executes the pre-shift control in a manner where the third shift stage gear set 33a and 33b of the first gear transmission mechanism 30A for establishing the shift stage, which is one stage upper than the second shift stage is selected from the first gear transmission mechanism 30A, in which the currently-selected second shift stage gear set 32a and 32b is not provided, and then the process proceeds to steps 105 to 107.

During the repetitive execution of the process of steps 105 to 107, when the command of shifting the shift stages to the third shift stage is outputted from the shift mechanism 54 in response to the manual operation of the driver, the control device 50 actuates the first and second clutch actuator 25a and 26a in step 108 in order to disengage the second clutch 26 of the dual clutch 24 while engaging the first clutch 25 of the dual clutch 24. Consequently, the rotational torque of the engine 11 is transmitted to the first output shaft 23 via the first clutch 25, the first input shaft 21, the first shift clutch 41 and the third shift stage gear set 33a and 33b. Thus, as described above, the shift stage, which reflects the intention of the driver for shifting the shifts stage, is pre-shifted before the command of shifting the shift stages is outputted from the shift mechanism 54 in response to the manual operation of the driver. Therefore, only the dual clutch 24 is required to be operated when the shift stages are shifted. Accordingly, time required to shift the shift stages may be reduced, and the driver may not feel uncomfortable in the shift operation.

On the other hand, during the repetitive execution of the process from steps 105 to 107, when the command of shifting the shift stages to the third shift stage is not outputted in response to the manual operation of the driver in a manner where the driver decelerates the vehicle and the like, so that all the values of the accelerator opening degree O, the rotational speed R and the rotation acceleration A, which are inputted and calculated in step 106, are equal to or less than the upper shift stage pre-shift releasing values Oc, Rc and Ac of the second shift stage, the control device 50 determines that step 107 is YES, and then the process proceeds to the step 109. In step 109, the control device 50 actuates the first clutch actuator 45 so as to move the first sleeve 41b of the first shift clutch 41 in the neutral position. Accordingly, the selection of the third shift stage gear set 33a and 33b, which is pre-shifted, is canceled, and then the process shown in the flow chart ends. Thus, the control device 50 determines that the driver abandons the intention of shifting the shift stages to the third shift stage established by the pre-shifted third shift stage gear set 33a and 33b, on the basis of the accelerator opening degree O, the rotational speed R and the rotation acceleration A. Therefore, the pre-shift control, which becomes unnecessary, is canceled, and accordingly, even when the command of shifting the shift stages to the first shift stage, which is different from the pre-shifted third shift stage, is outputted, the shifting of shift stages is not delayed. After the pre-shift control is canceled in step 109, the control device 50 again executes the program staring from step 101.

In contrast to the above-described case where the driver accelerates the vehicle in a state where the dual clutch transmission 10 is in the second shift stage, in a case where the driver decelerates the vehicle, so that all the values of the accelerator opening degree O, the rotational speed R and the rotation acceleration A are equal to or less than the lower shift stage pre-shift setting values Ob, Rb and Ab of the second shift stage, the control device 50 determines that step 102 is NO and that step 103 is YES, and then the process proceeds to step 110. In step 110, the control device 50 actuates the first shift clutch actuator 45 so as to move the first sleeve 41b of the first shift clutch 41 in the left direction in FIG. 1. Consequently, the control device 50 executes the pre-shift control in a manner where the first shift stage gear set 31a and 31b of the first gear transmission mechanism 30A for establishing the shift stage, which is one stage lower than the second shift stage is selected from the first gear transmission mechanism 30A, in which the currently-selected second shift stage gear set 32a and 32b is not provided, and then the process proceeds to steps 111 to 113.

During the repetitive execution of the process of steps 111 to 113, when the command of shifting the shift stages to the first shift stage is outputted from the shift mechanism 54 in response to the manual operation of the driver, the control device 50 actuates the first and second clutch actuator 25a and 26a in step 114 in order to disengage the second clutch 26 of the dual clutch 24 while engaging the first clutch 25 of the dual clutch 24. Consequently, the rotational torque of the engine 11 is transmitted to the first output shaft 23 via the first clutch 25, the first input shaft 21, the first shift clutch 41 and the first shift stage gear set 31a and 31b. Thus, as described above, the shift stage, which reflects the intention of the driver for shifting the shifts stage, is pre-shifted before the command of shifting of the shift stages is outputted from the shift mechanism 54 in response to the manual operation of the driver. Therefore, only the dual clutch 24 is required to be operated when the shift stages are shifted. Accordingly, time required to shift the shift stages may be reduced, and the driver may not feel uncomfortable in the shift operation.

On the other hand, during the repetitive execution of the process from steps 111 to 113, when the command of shifting the shift stages to the first shift stage is not outputted in response to the manual operation of the driver in a manner where the driver accelerates the vehicle and the like, so that all the values of the accelerator opening degree O, the rotational speed R and the rotation acceleration A, which are inputted and calculated in step 112, are equal to or more than the lower shift stage pre-shift releasing values Od, Rd and Ad of the second shift stage, the control device 50 determines that step 113 is YES, and then the process proceeds to the step 115. In step 115, the control device 50 actuates the first clutch actuator 45 so as to move the first sleeve 41b of the first shift clutch 41 in the neutral position. Accordingly, the selection of the first shift stage gear set 31a and 31b, which is pre-shifted, is canceled, and then the process shown in the flow chart ends. Thus, the control device 50 determines that the driver abandons the intention of shifting the shift stages to the first shift stage established by the pre-shifted first shift stage gear set 31a and 31b, on the basis of the accelerator opening degree O, the rotational speed R and the rotation acceleration A. Therefore, the pre-shift control, which becomes unnecessary, is canceled, and accordingly, even when the command of shifting the shift stages to the third shift stage, which is different from the pre-shifted first shift stage, is outputted, the shifting of shift stages is not delayed. After the pre-shift control is canceled in step 115, the control device 50 again executes the program staring from step 101.

Further, as mentioned above, when the dual clutch transmission 10 is in the third to sixth shift stages, the program shown in the flow chart of FIGS. 3A and 3B is executed so as to execute the pre-shift control and the pre-shift releasing control. Effects of the pre-shift control and the pre-shift releasing control when the dual clutch transmission 10 is in the third to sixth shift stages are similar to the above-described effects thereof when the dual clutch transmission 10 in the first to second shift stages. Further, when the dual clutch transmission 10 is in the sixth shift stage, the process from steps 104 to 109 is not executed because there is no upper shift stage than the sixth shift stage.

In the dual clutch transmission 10 according to the embodiment, in a case where the first to sixth shift stage gear set 31a and 31b to 36a and 36b is not pre-shifted for establishing the one upper shift stage or the one lower shift stage, when the driver operates the shift mechanism 54 to shift the shifts stages, the control device 50 actuates each of the first to fourth shift clutch actuators 45 to 48 so as to select one of the plurality of first to sixth shifts stage gear sets 31a and 31b to 36a and 36b. Subsequently, the control device 50 engages one of the first and second clutches 25 and 26 of the dual clutch 24 while disengaging the other of the first and second clutches 25 and 26 of the dual clutch 24. Accordingly, the torque of the engine 11 is transmitted to the first output shaft 23 via each of the first and second input shaft 21 and 22.

According to the above-described embodiment, whether or not the driver has the intention of shifting the shift stages to the one lower shift stage is determined on the basis of the determination of whether or not all the values of the accelerator opening degree O, the rotational speed R of the engine 11 and the rotation acceleration A of the engine 11 are equal to or less than the lower shift stage pre-shift setting values Ob, Rb and Ab, in order to execute the pre-shift control. However, not limited to the above-described embodiment, similar effects may be obtained in a case where whether or not the driver has the intention of shifting the shift stages to the one lower shift stage is determined by means of a brake depressing degree sensor for detecting a depressing amount of a brake, which is provided instead of one or more of the above-described sensors (or, in addition to the above-described sensors).

According to the above-described embodiment, the dual clutch transmission 10, in which the shift stages are shifted in response to a manual operation, is described. However, similar effects may be obtained when the above-described embodiment is applied to a manual transmission mode of a dual clutch transmission, in which the manual transmission mode and an automatic transmission mode are selectable.

Accordingly, whether or not the driver has the intention of shifting the shift stages is determined on the basis of at least one of the accelerator opening degree O, the rotational speed R of the engine 11 and the rotation acceleration A. Therefore, the pre-shift control, which reflects the intension of the driver, is executed before the command of shifting the shift stages is outputted. Accordingly, a time required to shift the shift stages may be reduced and the driver may not feel uncomfortable.

According to the embodiment, the control device 50 further includes a pre-shift releasing device. In a state where the shift stage gear set 31a and 31b, 32a and 32b, 33a and 33b, 34a and 34b, 35a and 35b, 36a and 36b, which the pre-shift control device pre-selects, is not transmitting the rotational torque of the engine 11 by means of the dual clutch 24, when at least one of the values of the accelerator opening degree O, the rotational speed R, and the rotation acceleration A, becomes equal to or less than the predetermined upper shift stage pre-shift releasing values Oc, Rc and Ac, or equal to or more than the predetermined lower shift stage pre-shift releasing values Od, Rd and Ad, the pre-shift releasing device cancels the selection of the pre-shifted shift stage gear set 31a and 31b, 32a and 32b, 33a and 33b, 34a and 34b, 35a and 35b, 36a and 36b.

Accordingly, whether or not the driver abandons the intention of shifting the shift stages to the shift stage, which corresponds to the pre-shifted first to sixth shift stage gear set 31a and 31b to 36a and 36b, is determined on the basis of at least one of the accelerator opening degree O, the rotational speed R of the engine 11 and the rotation acceleration A. Therefore, an unnecessary pre-shift control is canceled, and accordingly, even when the command for shifting the shift stages to the shift stage, which is different from the pre-shifted shift stage, is outputted, the shifting of shift stages is not delayed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A dual clutch transmission comprising:
   a first input shaft;
   a second input shaft coaxially arranged with the first input shaft;
   an output shaft arranged in parallel with the first input shaft and the second input shaft;
   a dual clutch having a first clutch and a second clutch transmitting rotational torque of an engine to the first input shaft and the second input shaft, respectively;
   a first gear transmission mechanism arranged between the first input shaft and the output shaft, having a plurality of shift stage gear sets for establishing odd-numbered shift stages, selecting one of the plurality of shift stage gear sets for establishing the odd-numbered shift stages, and transmitting rotational torque of the first input shaft to the output shaft;
   a second gear transmission mechanism arranged between the second input shaft and the output shaft, having a plurality of shift stage gear sets for establishing even-numbered shift stages, selecting one of the plurality of shift stage gear sets for establishing the even-numbered shift stages, and transmitting rotational torque of the second input shaft to the output shaft; and
   a control device selecting one of the shift stage gear sets from either the first gear transmission mechanism or the second gear transmission mechanism, changing the first clutch and the second clutch of the dual clutch by disengaging the one of the first and second clutches which is in an engaged state while engaging the other of the first and second clutches which is in a disengaged state, on the basis of a command of shifting the shift stages in response to a manual operation, and transmitting the rotational torque of the engine to the output shaft by means of the selected shift stage gear set, wherein
   the control device is connected to at least one of an accelerator opening degree sensor, detecting an accelerator opening degree, and a rotational speed sensor, detecting a rotational speed of the engine, and is provided with a pre-shift control device pre-selecting one of the shift stage gear sets for establishing the shift stage, which is one stage upper or one stage lower than the shift stage established by the selected shift stage gear set, from one of the first and second gear transmission mechanisms, in which the selected shift stage is not provided, when at least one of values of the accelerator opening degree, detected by means of the accelerator opening degree sensor, the rotational speed, detected by means of the rotational speed sensor, and the rotation acceleration, calculated on the basis of the rotational speed detected by the rotational speed sensor, becomes equal to or more than predetermined upper shift stage pre-shift setting values or equal to or less than predetermined lower shift stage pre-shift setting values, and when the other of the first and second clutches is in the disengaged state.

2. The dual clutch transmission according to claim 1, wherein
   the control device further includes a pre-shift releasing device, and
   in a state where the shift stage gear set, which the pre-shift control device pre-selects is not transmitting the rotational torque of the engine by means of the dual clutch, when at least one of the values of the accelerator opening degree, the rotational speed, and the rotation acceleration becomes equal to or less than the predetermined upper shift stage pre-shift releasing values, or equal to or more than the predetermined lower shift stage pre-shift releasing values, the pre-shift releasing device cancels the selection of the pre-shifted shift stage gear set.

* * * * *